W. V. TURNER.
SAFETY CAR CONTROL.
APPLICATION FILED AUG. 24, 1916.
1,273,104. Patented July 16, 1918.
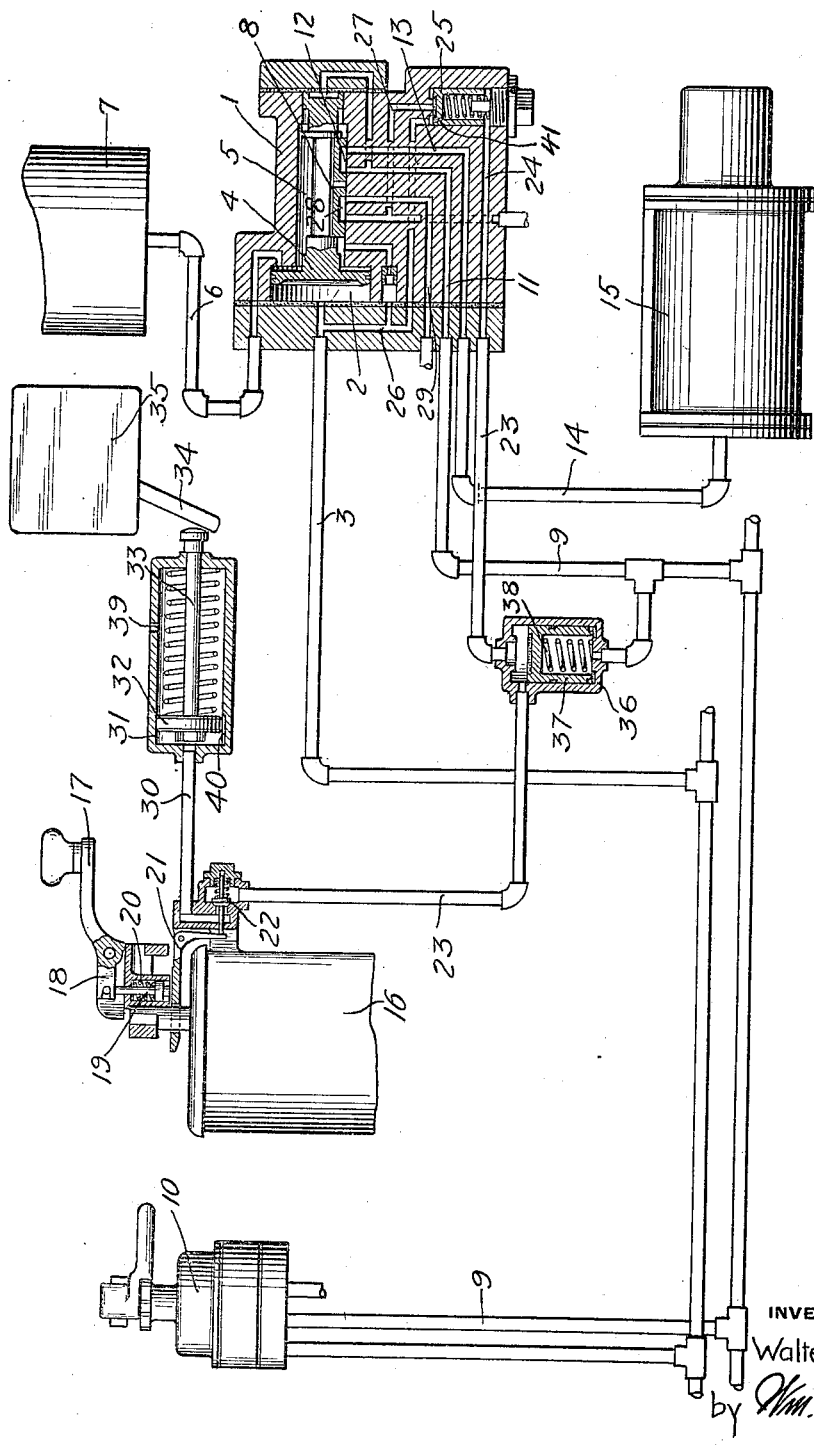
INVENTOR
Walter V. Turner
by Wm. M. Cady
Atty.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SAFETY CAR CONTROL.

1,273,104.      Specification of Letters Patent.     Patented July 16, 1918.

Application filed August 24, 1916. Serial No. 116,628.

*To all whom it may concern:*

Be it known that I, WALTER V. TURNER, a citizen of the United States, residing at Wilkinsburg, in the county of Allegheny and State of Pennsylvania, have invented new and useful Improvements in Safety Car Controls, of which the following is a specification.

This invention relates to a safety car control equipment, and more particularly to an equipment in which the brakes are automatically applied when the operator removes his hand from the controller handle.

It has heretofore been proposed to provide a safety car control equipment in which the brakes are applied when the operator releases the controller handle, but with these prior devices, means are provided for preventing the operation, if the controller handle is in "off" position.

It sometimes happens that the motorman will throw the controller handle to "off" position when the car is running, as in coasting and in going down grades, and in such cases, it is fully as important from a safety standpoint that the brakes be applied when the controller handle is released, as in other cases, in order to avoid accident.

One object of my invention is therefore to provide a safety car control equipment in which the brakes are applied when the hand is removed from the controller handle in any position of the handle.

It has also been proposed to employ the so-called straight air emergency brake equipment in which the brakes are normally applied in service by straight air and in emergency by the automatic action of an emergency valve device.

It will be evident that if the brakes have been applied by straight air it will not be necessary to have the automatic emergency valve device act upon release of the controller handle, since the desired braking of the car or train has previously been accomplished.

Another object of my invention is therefore to provide means operating upon a straight air application of the brakes for preventing an automatic application upon release of the controller handle.

In the accompanying drawing, the single figure is a diagrammatic view of a safety car control equipment embodying my invention.

As shown in the drawing, the equipment may comprise an emergency valve device 1 having a piston chamber 2 connected to emergency brake pipe 3 and containing piston 4 and a valve chamber 5 connected by pipe 6 to a supply reservoir 7 and containing a slide valve 8 adapted to be operated by piston 4.

Normally, a straight air pipe 9, leading to brake valve 10, is connected through passage 11, cavity 12, passage 13, and pipe 14 to brake cylinder 15 for controlling the brakes by straight air.

For effecting an automatic application of the brakes upon release of the controller handle, the controller 16 is provided with a pivoted controller handle 17, having an arm 18 connected to a stem 19 which is subject to the pressure of a spring 20 acting to throw the stem outwardly.

The stem 19 is adapted to act on one arm of a rocker lever 21, the other arm being in engagement with a normally closed pilot valve 22.

Leading to the pilot valve 22 is a pipe 23 which is connected through a passage 24 in the emergency valve device 1 with one side of a relay valve 25, the opening of which is adapted to connect piston chamber 2 through passage 26, passage 27, and cavity 28, in slide valve 8, with an exhaust passage 29.

When the pilot valve 22 is opened, fluid may be vented through a pipe 30 to piston chamber 31 containing a piston 32, the movement of which is adapted to open the circuit breaker, controlling the current on the car.

For this purpose, the piston 32 may be provided with a stem 33 adapted to engage the switch lever 34 of a circuit breaker 35.

In order to prevent an automatic application of the brakes when the hand is released from the controller handle, and the brakes are applied by straight air, a casing 36 is interposed in the pipe 23 containing a valve 37 having one side open to the piston 37 having one side open to the straight air pipe 9 and to the pressure of a spring 38 and having the opposite side normally subject to fluid pressure supplied from the reservoir 7, through passage 26, a small port 41 in the relay valve 25, passage 24, and pipe 23. When there is no fluid in the straight air pipe 9, the reservoir pressure seats the valve piston 37 against a seat at the straight air side of the piston and opens communication through pipe 23.

In operation, if the brakes are not applied by straight air, and the operator should remove his hand from the controller handle, the spring 20 forces the stem 19 against the rocker lever 21 and operates same to open the pilot valve 22.

Fluid under pressure on the spring side of the relay valve 25 is then vented to pipe 30 and piston chamber 31, so that piston 32 is operated to effect the opening of the circuit breaker 35. When the piston 32 passes beyond a port 39, fluid is vented from pipe 30 to the atmosphere and the relay valve 25 is then operated by fluid pressure in piston chamber 2 so as to open communication from said piston chamber to the atmosphere. The emergency piston 4 then operates the slide valve 8, and passage 13 is uncovered, thus permitting fluid to flow from valve chamber 5 to the brake cylinder to effect an automatic application of the brakes.

The controller handle is constructed so as to open the pilot valve 22 upon release of the controller handle in any position of the handle, including the "off" position, so that an automatic emergency application of the brakes will be obtained if the motorman becomes incapacitated with the controller handle in "off" position, as may be the case when coasting or on grades with the power shut off.

If, however, a straight air application of the brakes is made, the pressure of fluid in the straight air pipe 9 in addition to the pressure of spring 38 acts on valve piston 37 and shifts same to its outer seat, in which communication is closed through pipe 23.

It will therefore be evident that so long as a straight air application of the brakes is maintained, the emergency valve device will not be operated by the removal of the hand from the controller handle.

In order to prevent the possible movement of the piston 32, to open the circuit breaker, by fluid under pressure in pipe 23, in case the controller handle is released when a straight air application of the brakes has been made, a leakage groove 40 may be provided around the piston 32 which is open in the normal release position of the piston.

This leakage groove 40 is of sufficient capacity, so that if the pilot valve 22 is opened upon release of the controller handle, the fluid in pipe 23 can escape fast enough to prevent movement of the piston, the valve piston 37 being seated to close communication through the pipe 23 from the emergency valve device 1.

Having now described my invention, what I claim as new and desire to secure by Letters Patent, is:

1. In a safety car control equipment, the combination with a controller handle, of automatic means operated upon a reduction in fluid pressure for effecting an application of the brakes, a valve operated upon release of the controller handle for venting fluid from said means, means for effecting a straight air application of the brakes, and a valve controlling communication through which fluid is vented from said automatic means and operated upon a straight air application of the brakes for closing said communication.

2. In a safety car control equipment, the combination with a controller handle and a valve operated upon release of the controller handle for automatically effecting an application of the brakes, of a valve mechanism for controlling the brakes by straight air and a valve piston operated by fluid supplied in a straight air application of the brakes for cutting off communication to said valve.

3. In a safety car control equipment, the combination with an emergency valve device for effecting an application of the brakes, a controller handle, and means operated upon release of the controller handle for venting fluid from said emergency valve device to operate same, of means for effecting a straight air application of the brakes and a valve piston operated by straight air for preventing the venting of fluid from said emergency valve device to said means upon release of the controller handle.

4. In a safety car control equipment, the combination with an emergency valve device for effecting an application of the brakes, a controller handle, and means operated upon release of the controller handle for venting fluid from said emergency valve device to operate same, of means for effecting a straight air application of the brakes and a valve piston normally opening communication for venting fluid from said emergency valve device and operated by fluid supplied to effect a straight air application of the brakes for closing said communication.

5. In a safety car control equipment, the combination with an emergency valve device and a controller handle adapted upon release for venting fluid from said emergency valve device to effect an application of the brakes, of a piston operated by fluid vented from said emergency valve device for operating a circuit breaker, said piston having a leakage groove for permitting escape of fluid around the piston.

In testimony whereof I have hereunto set my hand.

WALTER V. TURNER.